US 6,744,751 B1

(12) United States Patent
Lamy

(10) Patent No.: US 6,744,751 B1
(45) Date of Patent: Jun. 1, 2004

(54) SYSTEM FOR TRANSPORTING FULL T1 FRAME OF DATA/VOICE CHANNELS AND ADDITIONAL DS0 DATA CHANNELS OVER E1 COMMUNICATION LINK

(75) Inventor: Michael F. Lamy, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/518,587

(22) Filed: Mar. 3, 2000

(51) Int. Cl.$^7$ .................................................. H04J 3/00
(52) U.S. Cl. ..................................................... 370/337
(58) Field of Search ........................ 320/337; 402/217; 398/537; 310/430–435; 335/241; 314/287; 389/395, 465–469; 455/427–436, 512, 428–430, 12.1, 431, 426.1, 422.1; 725/106–109, 118; 375/261, 298; 379/14.01, 15.05, 2, 27.04, 29.01

(56) References Cited

U.S. PATENT DOCUMENTS

| | | | | |
|---|---|---|---|---|
| 5,495,516 A | * | 2/1996 | Lee et al. ................. 379/14.01 |
| 5,526,349 A | | 6/1996 | Diaz et al. .................. 370/58.1 |
| 5,526,397 A | | 6/1996 | Lohman ....................... 379/58 |
| 5,796,742 A | * | 8/1998 | Klotzbach et al. .......... 370/466 |
| 5,799,019 A | | 8/1998 | Kim et al. ................... 370/465 |
| 5,875,191 A | | 2/1999 | Deschaine et al. .......... 370/466 |
| 5,896,568 A | * | 4/1999 | Tseng et al. ................. 455/422 |
| 6,208,664 B1 | * | 3/2001 | Plummer et al. ............ 370/480 |
| 6,252,910 B1 | * | 6/2001 | West et al. .................. 375/261 |
| 6,351,452 B1 | * | 2/2002 | Koenig et al. .............. 370/217 |
| 6,359,894 B1 | * | 3/2002 | Hong et al. ................. 370/402 |
| 6,370,155 B1 | * | 4/2002 | Cantwell et al. ............ 370/465 |

* cited by examiner

Primary Examiner—Chi Pham
Assistant Examiner—Prenell Jones
(74) Attorney, Agent, or Firm—Allen, Dyer, Doppelt Milbrath & Gilchrist, P.A.

(57) ABSTRACT

In addition using twenty-four DS0 channels of an E1 transport rate-based digital communication link to convey an entire T1 frame of voice/data channels, an additional 364 Kbps bandwidth is used to convey a plurality of (up to six) DS0 data channels, without having to modify the signaling properties of the T1 frame into the higher transport rate protocol. For non-primary T1 voice channels, robbed encoded signaling bits are inserted 'as is' into the E1 signaling channel and mu-law encoded voice is inserted into 24 DS0 channels of the E1 frame. For primary rate ISDN (having no robbed bits), the signaling channel of the E1 frame becomes available for any ISDN channel. This allows the 'D' channel of the ISDN frame to be inserted in any of the thirty-one available E1 time slots.

8 Claims, 1 Drawing Sheet

SYSTEM FOR TRANSPORTING FULL T1 FRAME OF DATA/VOICE CHANNELS AND ADDITIONAL DS0 DATA CHANNELS OVER E1 COMMUNICATION LINK

FIELD OF THE INVENTION

The present invention relates in general to digital telecommunication systems, and is particularly directed to a mechanism for augmenting the T1 voice channel-carrying capacity of a T1 digital communication link, by operating the link as a higher bandwidth signaling protocol link, such as an E1 link, and multiplexing onto the link, in addition to an entire T1 frame of twenty-four DS0 channels, a plurality of (up to six) additional DS0 (data) channels without converting the signaling properties of the T1 channels into E1 protocol.

BACKGROUND OF THE INVENTION

With the ongoing demand for increased bandwidth capacity, digital network service providers are continuously seeking ways to extract more performance from their existing communication network infrastructures. In particular, there is a continuing demand for more bandwidth, while voice transport demand has not diminished, so that both voice and data are typically transported over the same channelized path (e.g., local loop). In the United States, the existing digital communication infrastructure employs basic rate (T1) channelized time division multiplexed (TDM) digital communication protocol, which is defined as twenty-four DS0 (e.g., voice) channels, each providing 64 Kbps worth of bandwidth, for a total or cumulative T1 bandwidth capacity of 1.536 Mbps. As shown in the time slot/channel diagram of FIG. 1, a respective channelized T1 frame contains twenty-four, eight-bit bytes or time slots TS1–TS24, plus a frame sync bit, for a total of 193 bits per frame (which corresponds to an overall clock rate of 1.544 Mhz). In order to convey signaling control information for a respective DS0 voice channel TS1, selected least significant bits, termed A/B (C/D) bits, are periodically 'robbed' and used as signaling bits. Voice signals are encoded using mu-law coding.

Other, non-domestic networks, on the other hand, such as those installed in Europe, and Central and South America, employ E1 rate channelized TDM digital communication protocol, which has a higher overall clock rate (2.048 MHz) and available information transport bandwidth capacity (1.920 Mbps). As shown in the time slot/channel diagram of FIG. 2, a respective E1 frame contains thirty-two, eight-bit bytes/time slots TS0–TS31. Of these thirty-two time channels/time slots, one channel—channel sixteen TS16—is used for signalling information; another channel—channel TS0—serves as a frame synchronization channel. Voice is encoded using A-law coding. The remaining thirty channels (TS1–TS15 and TS17–TS31) provide a total available information transport bandwidth capacity of 1.920 Mbps, which exceeds that of a standard T1 link by 384 Kbps, or six DS0 channels (and happens to be the number of T1 channels required for achieving high efficiency data transport).

Because of differences in their framing structures and the fact that their signaling coding schemes and voice encoding (mu-law vs. A-law) are mutually incompatible, T1 networks and E1 networks cannot be readily interchanged for one another. Instead, the two are customarily interfaced by means of a relatively complex network converter (a T1-E1 converter when going from a T1 system (e.g., in the United States) to an E1 system (e.g., in Mexico), and an E1-T1 converter when going from an E1 to an T1 system). Unfortunately, current T1-E1 network converters simply map T1 protocol into E1 protocol, without taking advantage of the additional unused portion of the E1 bandwidth. Although, in such instances, the transport efficiency of the E1 link is less than optimum, it at least provides delivery of the T1 channels to the far end of the E1 link.

SUMMARY OF THE INVENTION

In accordance with the present invention, advantage is taken of additional bandwidth available in an elevated transport rate-based digital communication link to transport both an entire T1 frame of twenty-four DS0 voice/data channels, and a plurality of (up to six) additional DS0 data channels without converting the signaling properties or voice coding of the T1 frame into the higher transport rate protocol. As a non-limiting example, the elevated transport rate-based digital communication link may be operated at the augmented 2.048 MHz clock rate of an E1 link. This elevated clocking rate of the link is effective to increase its DS0 transport capacity from twenty-four channels (associated with a standard T1 data rate of 1.536 Mbps) to thirty channels (associated with a standard E1 data rate of 1.920 Mbps).

Rather than change the protocol and coding of the T1 voice/data channels, these channels and additional DS0 channels are multiplexed into the time slots/channels of the E1 framing structure. For the case of non-primary T1 voice channels, robbed signaling bits are inserted into the E1 signaling channel. Each end of the link is coupled to its own T1/E1 multiplexer/demultiplexer (mux/demux), that is configured of an intercoupled arrangement of conventional digital data communication T1 and E1 framers, plus a standard digital access and cross-connect system (DACS). The E1 framer is coupled to the communication link, and to a robbed bit signaling port of a voice channel T1 framer through which up to twenty-four DS0 voice/data channels are interfaced with mux/demux. A data channel T1 framer is coupled to interface a limited number of additional (e.g., up to six) DS0 data channels with the mux/demux. The DACS is coupled to each of the T1 framers and interfaces DS0 channels with the E1 framer.

In a typical non-primary rate channelized application, the voice/data channel T1 framing unit interfaces the twenty-four T1 voice channels it receives with the DACS, while the data channel T1 framer interfaces the (six) data channels with the DACS. The DACS couples the total of these thirty DS0s to the E1 framer for insertion into thirty time slots of the outgoing E1 frame. Frame sync bits are carried by E1 channel TS0, while the robbed signaling bits are applied directly from the T1 framer to the E1 framer using channel associated signaling for insertion into the E1 signaling channel TS16. At the receive end of the link, the far end E1 framer couples the contents of the thirty DS0 information (voice and data) channels to the DACS for distribution to associated voice channel and data channel T1 framers. It also extracts the robbed signaling bit contents of the signaling channel to the voice channel T1 framer for insertion into outgoing T1 voice channels.

For primary rate ISDN, since their are no robbed signaling bits, the signaling channel of the E1 frame becomes available for any ISDN channel. As a result, the control 'D' channel of the T1 primary rate ISDN frame may be transported in any of the E1 frame's thirty-one available time slots. Demultiplexing at the receive end of the link is essentially the same as described above for the non-primary rate case, except that there is no robbed bit signaling transfer between the E1 framer and the voice channel T1 framer. Instead, all thirty-one channels are coupled directly to the DACS, which transfers the twenty-four primary rate ISDN channels to the voice channel T1 framer and the remaining six DS0s to the data channel T1 framer. Once again, the voice coding would not change (μ-law to A-law).

DETAILED DESCRIPTION

Figure 1:
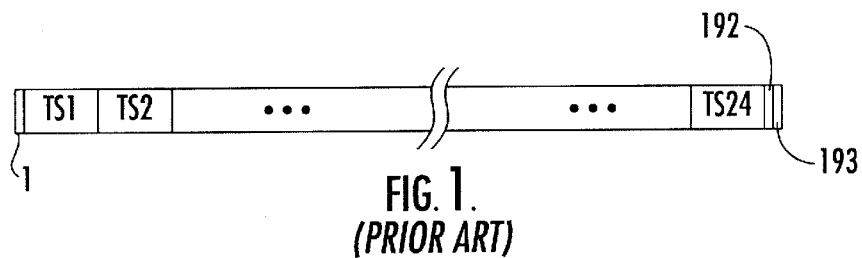
FIG. 1 is a time slot diagram of a channelized T1 frame.
Figure 2:
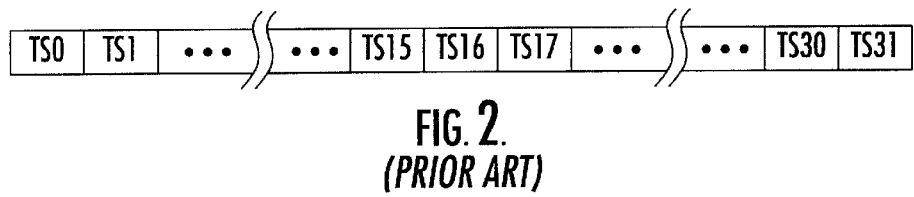
FIG. 2 is a time slot diagram of a channelized E1 frame.

Before describing in detail the new and improved E1-based, T1 channel capacity expansion mechanism of the present invention, it should be observed that the invention resides primarily in what are effectively modular arrangements of conventional communication circuits and associated digital signal processing components and attendant supervisory control circuitry therefor, that controls the operations of such circuits and components. In a practical implementation that facilitates their incorporation into a telecommunication equipment bay or shelf, these modular arrangements may be readily implemented as field programmable gate array (FPGA)-implemented, or application specific integrated circuit (ASIC) chip sets.

Consequently, the configuration of such circuits components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

Figure 3:
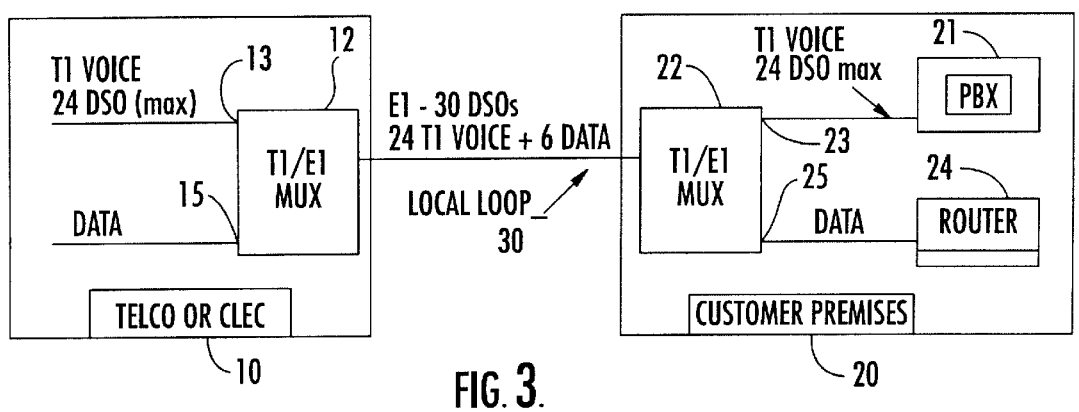
FIG. 3 diagrammatically illustrates a digital telecommunication network employing the E1-based, T1 channel capacity expansion mechanism of the present invention.

FIG. 3 diagrammatically illustrates a simplified representation of a digital telecommunication network, in which the E1-based, T1 channel capacity expansion mechanism of the present invention may be employed, as comprising a first or 'west' end site 10, such as a central office of an incumbent local exchange carrier (ILEC), or a distribution center of a competitive local exchange carrier (CLEC), such as an internet service provider. Remote with respect to the west end site 10 is a second, or 'east' end (customer premises associated) site 20, which is linked to the communication service provider site 10 by way of a digital communication link 30. The digital communication link 30 may comprise, but is not limited to, a fiber optic link, that is capable of transporting high bandwidth digital is communication channels interfaced with the west end site 10 and customer circuits of the east end site 20, such as voice channels of a private branch exchange (PBX) 21, and data channels of data distribution equipment, such as a router 24.

The digital communication link 30 is interfaced at the west end site 10 by means of a T1/E1 multiplexer/demultiplexer (mux/demux) 12 (shown in FIG. 4 to be described), which has a first port 13 for interfacing up to an entire T1 frame of (twenty-four) DS0 voice channels, and a second port 15 for interfacing a plurality of (up to six) additional DS0 (data) channels. In a complementary fashion, the link 30 is interfaced at the east end site 10 by means of a T1/E1 mux/demux 22 (shown in FIG. 4), which has a first port 23 for interfacing (up to an entire T1 frame of twenty-four) DS0 voice channels with voice channel equipment such as the PBX 21, and a second port 25 for interfacing a plurality of (e.g., up to six) additional DS0 data channels with data distribution equipment (router) 24.

As described above, pursuant to the present invention, the digital communication link 30 is operated at a higher transport rate than a conventional T1 link, for example at the augmented 2.048 MHz clock rate of an E1 link. This elevated clocking rate of the link 30 is effective to increase its DS0 transport capacity from twenty-four channels (or a standard T1 data rate of 1.536 Mbps) to thirty channels (or a standard E1 data rate of 1.920 Mbps). In addition, rather than perform a conversion of the T1 protocol channels into E1 protocol (which would not take advantage of the additional bandwidth, as described above), the present invention retains the protocol and coding of the T1 channels and simply controllably multiplexes the contents of these channels into the standard E1 framing format for transport over the link 30. Robbed signaling bits of the T1 channels are inserted into the signaling channel (TS16) of the E1 frame.

Figure 4:
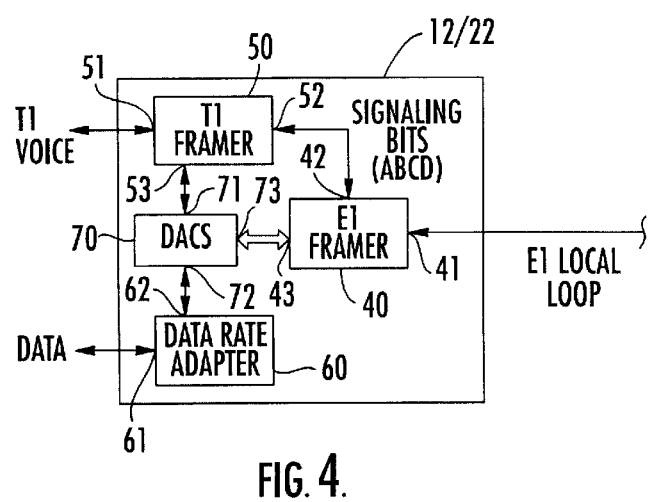
FIG. 4 illustrates the architecture of a T1/E1 mux/demux employed in the network diagram of FIG. 3.

For this purpose, as diagrammatically illustrated in FIG. 4, each of the T1/E1 mux/demux 12 at the west end site 10 and the T1/E1 mux/demux 22 at the east end site 20 includes an intercoupled arrangement of conventional digital data communication framer circuits, plus a standard DACS. These components are operative to controllably multiplex DS0 voice/data channels of a T1 frame and auxiliary DS0 data channels into an E1 frame, together with robbed signaling bits of the T1 voice/data channels (which are inserted into the signaling channel (TS16) of the E1frame) for transport over the E1 link. In a complementary manner, the framing and DACS units demultiplex a received E1 frame (of thirty-two DS0 channels) back into the respective T1 voice/data channels and auxiliary channels at the far end of the link.

In particular, an E1 framer 40 has a serial communication port 41 coupled to the communication link 30, and a first (voice channel) T1 framer 50 has a serial communication port 51 through which (up to twenty-four) DS0 voice/data channels are interfaced with the mux/demux. The voice channel T1 framer 50 also includes a second port 52, through which robbed (A,B,C,D) signaling bits are coupled to a signaling bit port 42 of the E1 framer 40. Each T1/E1 mux/demux further includes a data rate adapter 60 having a serial communication port 61, through which a limited number of additional (e.g., up to six) DS0 data channels are interfaced with the mux/demux. A DACS 70 has a first port 71 coupled to a third port 53 of the voice channel T1 framer 50, a second port 72 coupled to a second port 62 of the data rate adapter 60 and a third port 73 coupled to a port 43 of the E1 framer.

In operation, consider the case of a respective non-primary rate T1 voice channel frame containing twenty-four DS0 voice channels being supplied to port 13 of the T1/E1 mux/demux 12 at the west end site 10 of FIG. 3, for delivery to the PBX 21 at the east end site 20. In addition, a 364 Kbps wide data channel (comprised of six 64 Kbps DS0s) is supplied to the second port 15 for transport to the router 24 at the east end of the link. In accordance with standard T1 framing protocol, the voice/data channel T1 framing unit 50 couples the contents of the respective time slots or digitized voice channels TS1–TS24 being serially supplied to port 13 and thereby to its port 51 to DACS 70, which couples the twenty-four T1 DS0s to the E1framer 40 for insertion into twenty-four time slots of the E1 frame (such as channels TS1–TS15 and TS17–TS25). Frame sync bits are carried by channel TS0, while the robbed signaling bits are applied directly from the T1 framer 50 to the E1 framer 40 using channel associated signaling for insertion into the signaling channel TS16, as described above.

The additional six 64 Kbps DS0s supplied to the port 15 are coupled by the data rate adapter 60 to the DACS 70, which couples the six DS0s to the E1 framer 40 for insertion into the remaining six time slots of the E1 frame (such as channels TS26–TS31). At the receive (east) end of the link, the E1 framer 40 couples the contents of the thirty DS0 information (voice and data) channels (TS1–TS15 and TS17–TS31) to the DACS 70 for distribution to associated T1 framer 50 and data rate adapter 60. It also extracts the robbed signaling bit contents of the signaling channel TS16 to the T1 framer 50 for insertion into the outgoing T1 frame to the PBX 21.

For the case of primary rate ISDN, since their are no robbed signaling bits, the signaling channel TS16 of the E1frame becomes available for any ISDN channel (B1–B23 or D). Thus, the T1 frame's ISDN signaling/control 'D' channel (time slot TS24) of the T1 primary rate ISDN frame applied to port 13 may be transported in any of the E1 frame's thirty-one available time slots TS1–TS31. The demultiplexing operation at the receive end of the link is essentially the same as described above for the non-primary rate case, except that there is no robbed bit signaling transfer between the E1 framer 40 and the voice channel framer 50. Instead, all thirty-one channels are coupled directly to the DACS 70, which transfers the twenty-four primary rate ISDN channels to the voice channel T1 framer 40, and the remaining six DS0s to the data rate adapter 60.

As will be appreciated from the foregoing description, the present invention provides a mechanism for augmenting the T1 channel-carrying capacity of a digital communication link, by means of an interoperable set of standard (T1 and E1) data communication circuits, that enable the link to be operated as a higher bandwidth signaling (E1) protocol link, and multiplexing onto the E1 link both an entire T1 frame of twenty-four DS0 channels as well as a plurality of (e.g., six) additional DS0 channels. Rather than having to convert the coding of mu-law voice or signaling for robbed bits of the T1 frame, the voice and signaling bits are transported, as is, in that time slot of the E1 frame dedicated for the purpose.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A method of transporting digital communication channels having first communication signalling properties over a time division multiplex (TDM) digital communication link from a first site to a second site comprising the steps of:

(a) multiplexing respective ones of a plurality of digital voice/data channels into individual TDM communication channels of a TDM transport protocol employed by said TDM communication link, said TDM transport protocol having a cumulative bandwidth higher than that of said plurality of digital data/voice channels; and (b) multiplexing respective ones of a multiplicity of digital data channels into individual TDM communication channels of said TDM transport protocol employed by said TDM communication link, said multiplicity of digital data channels having a bandwidth lower than that of said plurality of digital data/voice channels.

2. A method according to claim 1, wherein said TDM transport protocol corresponds to E1 rate TDM transport protocol having a cumulative bandwidth of 1920 Kbps, step (a) comprises multiplexing twenty-four T1 DS0 data/voice channels in twenty-four of the thirty available 64 Kbps DS0 channels of said E1 rate TDM transport protocol, and step (b) includes multiplexing up to an additional six DS0 data channels in remaining ones of the thirty available 64 Kbps DS0 channels of said E1 TDM transport protocol.

3. A method according to claim 2, wherein said E1 TDM transport protocol employs an additional 64 Kbps channel, and wherein step (a) includes multiplexing signaling information associated with twenty-four T1 DS0 voice channels in said additional 64 Kbps channel.

4. A method according to claim 3, wherein step (a) includes conveying mu-law coded voice signals in said 64 Kbps channel of said E1 TDM digital communication link.

5. A system for transporting digital communication channels having first communication signalling properties over a time division multiplex (TDM) digital communication link from a first site to a second site comprising:

at said first site, a first multiplexer which is operative to multiplex respective ones of a plurality of digital voice/data channels into individual TDM communication channels of a TDM transport protocol employed by said TDM communication link, said TDM transport protocol having a cumulative bandwidth higher than that of said plurality of digital data/voice channels, and to multiplex respective ones of a multiplicity of digital data channels into individual TDM communication channels of said TDM transport protocol employed by said TDM communication link, said multiplicity of digital data channels having a bandwidth lower than that of said plurality of digital data/voice channels; and at said second site, a demultiplexer which is operative to demultiplex, from said individual TDM communication channels transported by said TDM communication link, said plurality of digital voice/data channels and said multiplicity of digital data channels.

6. The system according to claim 5, wherein said TDM transport protocol corresponds to E1 rate TDM transport protocol having a cumulative bandwidth of 1920 Kbps, and said multiplexer is operative to multiplex twenty-four T1 DS0 data/voice channels in twenty-four of the thirty available 64 Kbps DS0 channels of said E1 rate TDM transport protocol, and to multiplex up to an additional six DS0 data channels in remaining ones of the thirty available 64 Kbps DS0 channels of said E1 TDM transport protocol.

7. The system according to claim 6, wherein said E1 TDM transport protocol employs an additional 64 Kbps channel, and wherein said multiplexer is operative to multiplex signaling information associated with twenty-four T1 DS0 voice channels in said additional 64 Kbps channel.

8. The system according to claim 7, wherein said multiplexer is operative to convey mu-law coded voice signals in said 64 Kbps channel of said E1 TDM digital communication link.

* * * * *